No. 754,965. PATENTED MAR. 22, 1904.
G. A. BLAKE.
HOLDER FOR TANK FLOATS.
APPLICATION FILED APR. 30, 1903.
NO MODEL.

Witnesses
J. G. Hinkel
Wm Gillman Jr

Inventor
George A. Blake
By Forest Freeman Weaver
Attorneys

No. 754,965. Patented March 22, 1904.

UNITED STATES PATENT OFFICE.

GEORGE A. BLAKE, OF NEW BEDFORD, MASSACHUSETTS.

HOLDER FOR TANK-FLOATS.

SPECIFICATION forming part of Letters Patent No. 754,965, dated March 22, 1904.

Application filed April 30, 1903. Serial No. 155,039. (No model.)

*To all whom it may concern:*

Be it known that I, GEORGE A. BLAKE, a citizen of the United States, residing at New Bedford, in the county of Bristol, State of Massachusetts, have invented certain new and useful Improvements in Holders for Tank-Floats, of which the following is a specification.

The present invention relates to improvements in floats for ball-cocks—such as are commonly employed in cisterns, flushing-tanks, &c.—and particularly to means for connecting such floats to the rod or arm by which the valve is moved.

The invention will be described in connection with the accompanying drawings, in which—

Figure 1:
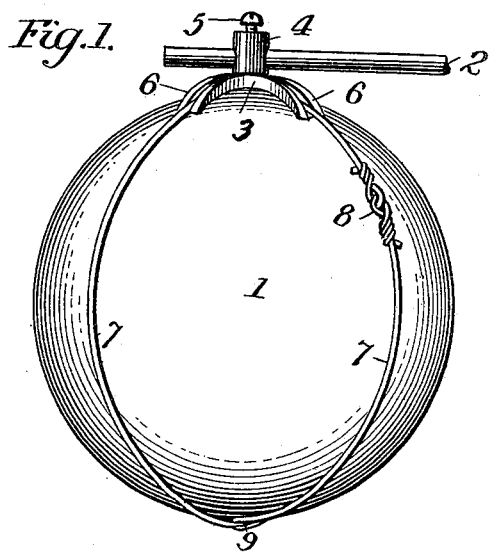
Figure 2:
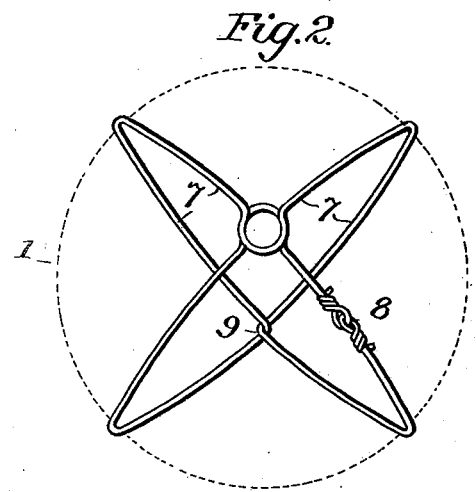
Figure 3:
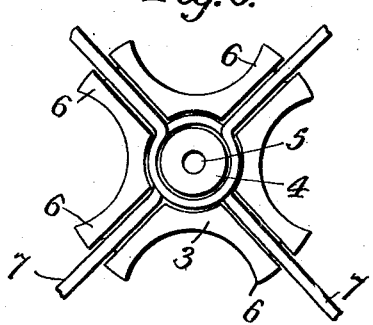
Figure 4:
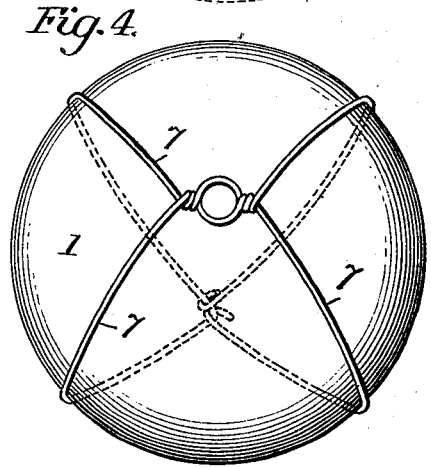
Figure 5:
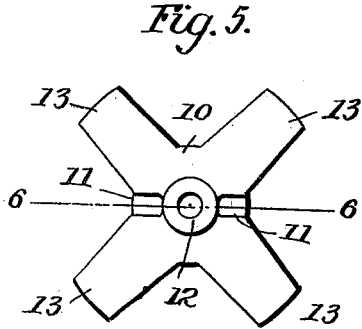
Figure 6:
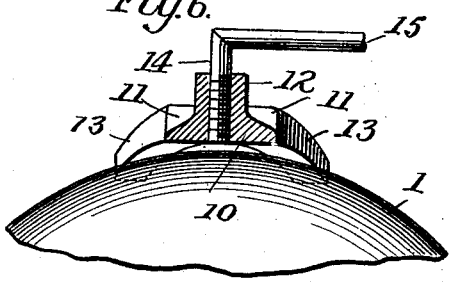

Figure 1 is a side elevation of a float having a holder embodying the present invention applied thereto. Fig. 2 is a perspective view of the holder shown in Fig. 1, the washer or plate for connecting said holder to the valve-rod being removed and the float indicated merely conventionally. Fig. 3 is a detail view, on an enlarged scale, of the said washer or plate. Fig. 4 is a perspective view illustrating a slightly-modified form of holder; and Figs. 5 and 6 are detail views of the washer or disk employed with the holder shown in Fig. 4, Fig. 6 being a sectional view on the line 6 6 of Fig. 5.

Like numerals of reference designate corresponding parts in the several figures of the drawings, referring to which—

1 designates the float, which may be of any suitable size, form, and material, and 2 designates the rod or stem by which the float is connected with the ball-cock.

It is important that the float and stem or rod 2 be securely connected and in such a manner that there is no danger of a leak being formed in the body of the float by or at the point of connection thereof with the stem.

By this invention the float is surrounded and securely held by a cage or frame formed of a single wire and a disk or washer which is adapted to be attached to the valve rod or stem. The latter is provided on its outer face or surface with suitable grooves or recesses to receive the members of the wire frame and with means for attachment to the rod or stem 2. The opposite lower face of the said disk or washer is made concave, being of such shape near its periphery as to conform to the exterior surface of the float 1, commonly made spherical in form, and is securely clamped thereon by the wire forming the body of the frame or holder.

In the embodiment of the invention illustrated in Figs. 1 to 3 the said disk or washer 3 is provided with a centrally-arranged outwardly-projecting stud 4, in which is formed an opening or passage through which the rod 2 extends, a set-screw 5 being employed to secure the said washer or disk to the rod or stem. The said washer or disk is also provided with four grooved arms 6, projecting radially from the said central stud 4, which is surrounded by a groove or way communicating with and connecting the inner ends of the grooves in said arms.

The main body of the frame or holder is formed by a single wire, which engages the washer or disk 3 and binds the same firmly against the float. As shown in Figs. 1 to 3, the wire 7 extends completely around the float and has its ends secured together, as indicated at 8. Said wire is seated in the grooves in the arms 6 and in the connecting annular groove about the stud 4, so that the washer or disk 3 is positively held from movement in any direction relative to the float. The said wire is also bent upon itself and has its end sections interlocked at a point diametrically opposite the said disk or washer, as indicated at 9 in Fig. 1.

The form of holder indicated in Fig. 4 differs from that shown in Figs. 1 and 2 only in the manner in which the wire forming the body of the holder is bent and engaged with the disk or washer by which it is attached to the valve-actuating stem or rod.

In each case the said holder-frame is formed from a single wire 7, bent to form a plurality of interlocked loops, each surrounding the float and firmly engaging a washer or disk seated thereon, said loops being interlocked at a point diametrically opposite said plate or washer. The form of the disk or washer 10 employed with the holder illustrated in Fig. 4 is slightly different from that heretofore described and shown in Fig. 3. The washer 10 has only two grooves 11 formed therein on opposite sides of the central stud 12, the arms 13 not being grooved, as in the washer 3. In the said stud 12 is preferably formed a threaded socket in which a threaded extension 14 on the valve stem or rod 15 can be secured.

From the foregoing description and the drawings it will be seen that the present invention provides a very simple, strong, and inexpensive holder by which a float can be securely attached to the valve-actuating rod or stem.

The washer or disk by which the holder and float are attached to said rod or stem may be made of various forms and the wire forming the body of the frame engaged therewith and with the float in any suitable manner, the forms illustrated being those deemed most satisfactory at this time.

Having thus described the invention, and without limiting myself to the exact details of the embodiments of the invention herein illustrated and described what I claim, and desire to secure by Letters Patent, is—

1. The combination with a valve-float, of a washer or disk seated on the float, a frame formed by a plurality of interlocked wire loops, surrounding the float and extending across said disk or washer to connect it to the float, and means for connecting the washer or disk to a valve rod or stem.

2. The combination with a valve-float, of a holder or frame for said float consisting of a single wire bent to extend around the float in different intersecting planes, and means for connecting said holder or frame to a valve rod or stem.

3. The combination with a valve-float, of a washer or disk seated on the float and provided with grooves or notches, a frame formed by a single wire surrounding the float on intersecting planes and securing the disk or washer thereon by extending through the grooves or notches therein, and means for connecting the washer or disk to a valve rod or stem.

In testimony whereof I have signed my name to this specification in the presence of two subscribing witnesses.

GEORGE A. BLAKE.

Witnesses:
FRED F. FRANCIS,
HARRY P. TRAFTON.